United States Patent
Ganiger et al.

(10) Patent No.: US 12,486,779 B2
(45) Date of Patent: Dec. 2, 2025

(54) SEAL SUPPORT ASSEMBLY FOR A TURBINE ENGINE

(71) Applicant: General Electric Company, Schenectady, NY (US)

(72) Inventors: Ravindra Shankar Ganiger, Bengaluru (IN); Vidyashankar Ramasastry Buravalla, Bengaluru (IN); David Raju Yamarthi, Bengaluru (IN); Rajesh Kumar, Bengaluru (IN); Jeffrey Douglas Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/180,449

(22) Filed: Mar. 8, 2023

(65) Prior Publication Data
US 2024/0301801 A1    Sep. 12, 2024

(51) Int. Cl.
*F01D 11/08*    (2006.01)
*F03G 7/06*    (2006.01)

(52) U.S. Cl.
CPC ........... *F01D 11/08* (2013.01); *F03G 7/0614* (2021.08); *F05D 2220/30* (2013.01); *F05D 2240/55* (2013.01)

(58) Field of Classification Search
CPC ... F01D 11/08; F05D 2220/30; F05D 2240/50
See application file for complete search history.

(56) References Cited

U.S. PATENT DOCUMENTS

| | | |
|---|---|---|
| 2,970,808 A | 2/1961 | Coppa |
| 3,146,992 A | 9/1964 | Farrell |

(Continued)

FOREIGN PATENT DOCUMENTS

| | | |
|---|---|---|
| CN | 108374694 A | 8/2018 |
| CN | 109973658 A | 7/2019 |

(Continued)

OTHER PUBLICATIONS

Bruce et al., Advanced Seal Technology Role in Meeting Next Generation Turbine Engine Goals, National Aeronautics and Space Administration Lewis Research Center, France, May 11-15, 1998, pp. 1-14.

(Continued)

*Primary Examiner* — Justin D Seabe
*Assistant Examiner* — Aye S Htay
(74) *Attorney, Agent, or Firm* — Dority & Manning, P.A.

(57) ABSTRACT

A turbine engine is provided. The turbine engine includes: a rotor; a stator having a carrier; a seal support assembly coupled to the carrier; and a seal assembly disposed between the rotor and the stator and supported by the seal support assembly, the seal assembly defining a high pressure side and a low pressure side and including a plurality of seal segments, the plurality of seal segments having a first seal segment, the first seal segment having a seal face configured to form a fluid bearing with the rotor, a lip assembly, and a body, the lip assembly positioned on the high pressure side, the lip assembly including a seal lip having a high pressure surface defining a first angle with an axial direction and a low pressure surface defining a second angle with the axial direction, the second angle being greater than the first angle.

16 Claims, 7 Drawing Sheets

(56) References Cited

U.S. PATENT DOCUMENTS

| | | | |
|---|---|---|---|
| 3,511,511 A | 5/1970 | Voitik | |
| 4,251,185 A | 2/1981 | Karstensen | |
| 4,307,993 A | 12/1981 | Hartel | |
| 4,334,822 A | 6/1982 | Rossmann | |
| 4,632,635 A | 12/1986 | Thoman et al. | |
| 4,747,603 A | 5/1988 | Sugino et al. | |
| 4,856,963 A | 8/1989 | Klapproth et al. | |
| 4,974,821 A | 12/1990 | Balsells | |
| 4,983,051 A | 1/1991 | Hibner et al. | |
| 5,100,158 A | 3/1992 | Gardner | |
| 5,143,384 A | 9/1992 | Lipschitz | |
| 5,201,530 A * | 4/1993 | Kelch | F16J 15/3288 277/355 |
| 5,301,957 A | 4/1994 | Hwang et al. | |
| 5,388,843 A | 2/1995 | Sedy | |
| 5,431,533 A | 7/1995 | Hobbs | |
| 5,509,664 A | 4/1996 | Borkiewicz | |
| 5,630,590 A * | 5/1997 | Bouchard | F16J 15/3288 415/230 |
| 5,639,210 A | 6/1997 | Carpenter et al. | |
| 5,975,537 A | 11/1999 | Turnquist et al. | |
| 6,059,526 A * | 5/2000 | Mayr | F16J 15/3288 415/231 |
| 6,145,843 A | 11/2000 | Hwang | |
| 6,202,302 B1 | 3/2001 | Descoteaux | |
| 6,210,103 B1 | 4/2001 | Ramsay | |
| 6,273,671 B1 | 8/2001 | Ress, Jr. | |
| 6,368,054 B1 | 4/2002 | Lucas | |
| 6,505,837 B1 | 1/2003 | Heshmat | |
| 6,514,041 B1 | 2/2003 | Matheny et al. | |
| 6,543,992 B2 | 4/2003 | Webster | |
| 6,572,115 B1 * | 6/2003 | Sarshar | F16J 15/3288 277/412 |
| 6,655,696 B1 | 12/2003 | Fang et al. | |
| 6,692,006 B2 | 2/2004 | Holder | |
| 6,808,179 B1 * | 10/2004 | Bhattacharyya | F16J 15/3288 415/174.3 |
| 6,811,154 B2 | 11/2004 | Proctor et al. | |
| 6,877,952 B2 | 4/2005 | Wilson | |
| 6,895,757 B2 | 5/2005 | Mitchell et al. | |
| 6,896,038 B2 | 5/2005 | Arilla et al. | |
| 7,066,470 B2 | 6/2006 | Turnquist et al. | |
| 7,079,957 B2 | 7/2006 | Finnigan et al. | |
| 7,086,649 B2 | 8/2006 | Plona | |
| 7,125,223 B2 | 10/2006 | Turnquist et al. | |
| 7,334,980 B2 | 2/2008 | Trinks et al. | |
| 7,367,776 B2 | 5/2008 | Albers et al. | |
| 7,435,049 B2 | 10/2008 | Ghasripoor et al. | |
| 7,438,526 B2 | 10/2008 | Enderby | |
| 7,448,849 B1 | 11/2008 | Webster et al. | |
| 7,459,081 B2 | 12/2008 | Koenig et al. | |
| 7,596,954 B2 | 10/2009 | Penda et al. | |
| 7,614,792 B2 | 11/2009 | Wade et al. | |
| 7,726,660 B2 | 6/2010 | Datta | |
| 7,752,849 B2 | 7/2010 | Webster et al. | |
| 7,901,186 B2 | 3/2011 | Cornett et al. | |
| 8,002,285 B2 | 8/2011 | Justak | |
| 8,047,765 B2 | 11/2011 | Wilson et al. | |
| 8,052,380 B2 | 11/2011 | Willett, Jr. | |
| 8,056,902 B2 | 11/2011 | Roddis et al. | |
| 8,113,771 B2 | 2/2012 | Turnquist et al. | |
| 8,142,141 B2 | 3/2012 | Tesh et al. | |
| 8,177,476 B2 | 5/2012 | Andrew et al. | |
| 8,186,945 B2 | 5/2012 | Bhatnagar et al. | |
| 8,210,799 B1 | 7/2012 | Rawlings | |
| 8,240,986 B1 | 8/2012 | Ebert | |
| 8,434,766 B2 | 5/2013 | Zeng et al. | |
| 8,556,578 B1 | 10/2013 | Memmen et al. | |
| 8,608,427 B2 | 12/2013 | Bock | |
| 8,641,045 B2 | 2/2014 | Justak | |
| 8,678,742 B2 | 3/2014 | Klingels | |
| 8,790,067 B2 | 7/2014 | McCaffrey et al. | |
| 8,864,443 B2 | 10/2014 | Narita et al. | |
| 8,985,938 B2 | 3/2015 | Petty | |
| 9,004,495 B2 * | 4/2015 | Vasagar | F16J 15/441 277/579 |
| 9,045,994 B2 | 6/2015 | Bidkar et al. | |
| 9,068,471 B2 | 6/2015 | Klingels | |
| 9,103,223 B2 | 8/2015 | Uehara et al. | |
| 9,115,810 B2 | 8/2015 | Bidkar et al. | |
| 9,145,785 B2 | 9/2015 | Bidkar et al. | |
| 9,169,741 B2 | 10/2015 | Szwedowicz et al. | |
| 9,200,530 B2 | 12/2015 | McCaffrey | |
| 9,255,489 B2 | 2/2016 | DiTomasso et al. | |
| 9,255,642 B2 | 2/2016 | Bidkar et al. | |
| 9,359,908 B2 | 6/2016 | Bidkar et al. | |
| 9,394,801 B2 | 7/2016 | Willett, Jr. | |
| 9,435,218 B2 | 9/2016 | Casavant et al. | |
| 9,528,554 B2 | 12/2016 | Moratz | |
| 9,587,746 B2 | 3/2017 | Bidkar et al. | |
| 9,598,971 B2 | 3/2017 | Hasnedl et al. | |
| 9,683,451 B2 | 6/2017 | Sonokawa et al. | |
| 9,869,196 B2 | 1/2018 | Day et al. | |
| 9,869,205 B2 | 1/2018 | Ganiger et al. | |
| 9,890,650 B2 | 2/2018 | Von Berg et al. | |
| 9,963,988 B2 | 5/2018 | Swedowicz et al. | |
| 9,976,435 B2 | 5/2018 | Borja et al. | |
| 10,041,534 B2 | 8/2018 | Ganiger et al. | |
| 10,060,280 B2 | 8/2018 | Crawley, Jr. et al. | |
| 10,077,782 B2 | 9/2018 | Zhang et al. | |
| 10,100,660 B2 | 10/2018 | Sippel et al. | |
| 10,161,259 B2 | 12/2018 | Gibson et al. | |
| 10,184,347 B1 | 1/2019 | D'Ambruoso | |
| 10,190,431 B2 | 1/2019 | Bidkar et al. | |
| 10,196,980 B2 | 2/2019 | Ganiger et al. | |
| 10,323,541 B2 | 6/2019 | Ganiger et al. | |
| 10,344,612 B2 | 7/2019 | Hudson et al. | |
| 10,352,455 B2 | 7/2019 | Berard et al. | |
| 10,385,715 B2 | 8/2019 | Wong et al. | |
| 10,415,418 B2 | 9/2019 | McCaffrey et al. | |
| 10,415,419 B2 | 9/2019 | Sun et al. | |
| 10,422,431 B2 | 9/2019 | Chuong et al. | |
| 10,436,070 B2 | 10/2019 | McCaffrey | |
| 10,443,424 B2 | 10/2019 | McCaffrey | |
| 10,533,446 B2 | 1/2020 | Barak et al. | |
| 10,920,593 B2 | 2/2021 | Millier et al. | |
| 10,962,024 B2 | 3/2021 | Nesteroff et al. | |
| 10,962,118 B2 | 3/2021 | Duffy et al. | |
| 10,995,861 B2 | 5/2021 | Hilbert et al. | |
| 11,047,481 B2 | 6/2021 | Bidkar et al. | |
| 11,193,590 B2 | 12/2021 | Black | |
| 2001/0007632 A1 | 7/2001 | Pesek et al. | |
| 2003/0102630 A1 * | 6/2003 | Dinc | F16J 15/445 277/355 |
| 2007/0053772 A1 | 3/2007 | Couture, Jr. et al. | |
| 2008/0056895 A1 | 3/2008 | Senoo | |
| 2008/0265513 A1 * | 10/2008 | Justak | F16J 15/442 277/411 |
| 2010/0078893 A1 | 4/2010 | Turnquist et al. | |
| 2012/0177484 A1 | 7/2012 | Lusted et al. | |
| 2012/0195741 A1 * | 8/2012 | Sarawate | F16J 15/441 277/355 |
| 2012/0211944 A1 | 8/2012 | Nishimoto et al. | |
| 2012/0223483 A1 | 9/2012 | Bidkar et al. | |
| 2012/0248704 A1 | 10/2012 | Fennell et al. | |
| 2013/0034423 A1 | 2/2013 | Adaickalasamy et al. | |
| 2014/0008871 A1 | 1/2014 | Bidkar et al. | |
| 2014/0062024 A1 | 3/2014 | Bidkar et al. | |
| 2014/0117624 A1 | 5/2014 | Bidkar et al. | |
| 2014/0119912 A1 | 5/2014 | Bidkar et al. | |
| 2015/0159498 A1 * | 6/2015 | Mukhopadhyay | F01D 11/08 415/173.1 |
| 2016/0010480 A1 | 1/2016 | Bidkar et al. | |
| 2016/0097291 A1 | 4/2016 | Hayford et al. | |
| 2016/0130963 A1 | 5/2016 | Wilson et al. | |
| 2016/0138412 A1 | 5/2016 | Rioux | |
| 2016/0376907 A1 | 12/2016 | O'Leary et al. | |
| 2017/0051621 A1 | 2/2017 | Ackermann et al. | |
| 2017/0051834 A1 | 2/2017 | Webster et al. | |
| 2017/0211402 A1 | 7/2017 | Peters et al. | |
| 2018/0045066 A1 | 2/2018 | Chuong | |
| 2018/0058240 A1 | 3/2018 | Chuong et al. | |
| 2018/0372229 A1 | 12/2018 | Bidkar et al. | |

(56) References Cited

U.S. PATENT DOCUMENTS

| | | |
|---|---|---|
| 2019/0072186 A1 | 3/2019 | Bidkar et al. |
| 2019/0085712 A1 | 3/2019 | Wesling et al. |
| 2019/0203842 A1 | 7/2019 | Bidkar et al. |
| 2019/0218926 A1 | 7/2019 | DiFrancesco et al. |
| 2019/0276851 A1 | 9/2019 | Lin |
| 2020/0040735 A1 | 2/2020 | Millier et al. |
| 2020/0063588 A1 | 2/2020 | Morliere et al. |
| 2020/0102845 A1 | 4/2020 | DiFrancesco et al. |
| 2020/0191162 A1 | 6/2020 | Weihard et al. |
| 2020/0318489 A1 | 10/2020 | Webb |
| 2020/0362716 A1 | 11/2020 | Glahn et al. |
| 2021/0207487 A1 | 7/2021 | George et al. |
| 2022/0154580 A1 | 5/2022 | Gainger et al. |
| 2022/0235667 A1 | 7/2022 | Mizumi et al. |
| 2022/0349475 A1 | 11/2022 | Nguyen et al. |

FOREIGN PATENT DOCUMENTS

| | | |
|---|---|---|
| CN | 113446069 A | 9/2021 |
| DE | 4011710 A1 | 10/1991 |
| EP | 2239423 A1 | 10/2010 |
| FR | 3042555 A1 | 4/2017 |
| FR | 3059041 B1 | 5/2020 |
| JP | S57195803 A | 12/1982 |
| JP | S58206807 A | 12/1983 |
| JP | S60111004 A | 6/1985 |
| WO | WO2010/112421 A1 | 10/2010 |

OTHER PUBLICATIONS

Chupp et al., Sealing in Turbomachinery, NASA/TM-2006-214341, National Aeronautics and Space Administration, Cleveland, OH, 2006, 62 Pages.

Delgado et al., A Review of Engine Seal Performance and Requirements for Current and Future Army Engine Platforms, NASA/TM-2008-215161, $43^{rd}$ Joint Propulsion Conference Co-Sponsored by AIAA, ASME, SAE, and ASEE, Cincinnati, OH, Jul. 8-11, 2007, 22 Pages.

Grondahl et al., Film Riding Leaf Seals for Improved Shaft Sealing, Proceeding of ASME Turbo Expo 2010: Power for Land, Sea and Air, GT2010-23629, Glasgow, UK, Jun. 14-18, 2010, 8 Pages.

Hamidizadeh, Study of Magnetic Properties and Demagnetization Models of Permanent Magnet for Electric Vehicles Application, Thesis McGill University, 2016, 84 Pages. https://escholarship.mcgill.ca/downloads/gb98mj16r.pdf.

Moore, Lip Seal, Materials Science, Fluoroelastomers Handbook 2006, 16 Pages. Retrieved Dec. 9, 2022 from Weblink https://www.sciencedirect.com/topics/materials-science/lip-seal.

Munson et al., Development of Film Riding Face Seals for a Gast Turbine Engine, Tribology Transactions, vol. 35, Issue 1, 1992, pp. 65-70.

Steinetz et al., Advanced Seal Technology Role in Meeting Next Generation Turbine Engine Goals, RTO AVT Symposium on Design Principles and Methods for Aircraft Gas Turbine Engines, Toulouse, France, May 11-15, 1998, 14 Pages.

\* cited by examiner

SEAL SUPPORT ASSEMBLY FOR A TURBINE ENGINE

FIELD

The present disclosure relates to a seal support assembly for a turbine engine.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by one or more rotor shafts and generally include multiple rows or stages of rotor blades coupled to the rotor shaft. Each individual row of rotor blades is axially spaced from a successive row of rotor blades by a respective row of stator or stationary vanes. A radial gap is formed between an inner surface of the stator vanes and an outer surface of the rotor shaft.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" or "turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "spring extension" refers to an object that is configured to deform elastically and store mechanical energy as a result of such deformation. A spring extension may be configured to deform linearly through extension or compression; may be configured to deform in a twisting manner through rotation about its axis; or in any other suitable manner.

The term "adjacent" with respect to a relative position of two like components refers to there being no other like components positioned therebetween. The term "adjacent" with respect to a relative position of two different components refers to there being no intervening structure separating the two components.

The term "shape memory alloy material" and "shape memory alloy (SMA)" generally refer to a metal alloy that experiences a temperature-related or strain-related, solid-state, micro-structural phase change. An SMA material may change from one physical shape to another physical shape. The temperature at which a phase change occurs generally is called the critical or transition temperature of the SMA. The SMA material may be constructed of a single SMA or of various SMA materials. In an embodiment, high temperature SMA may define transition temperatures ranging between about 20 degrees Celsius and about 1400 degrees Celsius. The transition temperature of the SMA may be tunable to specific applications.

In some embodiments, a component said to be formed of a SMA may include the SMA material as a major constituent, e.g., in an amount greater than 50 weight percent ("wt. %") of the component. In certain embodiments, the component may be essentially composed of the SMA material (e.g., at least 90 wt. %, such as at least 95 wt. %, such as 100 wt. %).

A SMA material is generally an alloy capable of returning to its original shape after being deformed. For instance, SMA materials may define a hysteresis effect where the loading path on a stress-strain graph is distinct from the unloading path on the stress-strain graph. Thus, SMA materials may provide improved hysteresis damping as compared to traditional elastic materials.

A SMA material may also provide varying stiffness, in a pre-determined manner, in response to certain ranges of temperatures. The change in stiffness of the shape memory alloy may be due to a temperature related, solid state micro-structural phase change that enables the alloy to change from one physical shape to another physical shape. The changes in stiffness of the SMA material may be developed by working and annealing a preform of the alloy at or above a temperature at which the solid state micro-structural phase change of the shape memory alloy occurs. Such may allow a component formed of a SMA to act as a spring extension having a desired stiffness profile.

In the manufacture of a component comprising SMA (also referred to as an SMA component) intended to change stiffness during operation of a gas turbine engine, the component may be formed to have one operative stiffness (e.g., a first stiffness) below a transition temperature and have another stiffness (e.g., a second stiffness) at or above the transition temperature.

The term "temperature-dependent shape memory alloy material" refers to a SMA characterized by a temperature-dependent phase change. These phases include a martensite phase and an austenite phase. The martensite phase generally refers to a lower temperature phase. Whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, a SMA component (such as a spring extension formed of an SMA material) may define a first stiffness at a first temperature and define a second stiffness at a second temperature, wherein the second temperature is different from the first temperature. Further, in some embodiments, one of the first temperature or the second temperature is below the transition temperature and the other one may be at or above the transition temperature. Thus, in some embodiments, the first temperature may be below the transition temperature and the second temperature may be at or above the transition temperature. While in some other embodiments, the first temperature may be at or above the transition temperature and the second temperature may be below the transition temperature. Further, various embodiments of SMA components described herein may be configured to have different first stiffnesses and different second stiffnesses at the same first and second temperatures.

The term "strain dependent shape memory alloy material" refers to a SMA characterized by a strain-dependent phase change. These phases similarly include a martensite phase and an austenite phase, which function in a similar manner as with the temperature dependent shape memory alloy materials, but instead of defining a transition temperature, the strain dependent SMAs define a transition strain Non-limiting examples of SMAs that may be suitable for forming various embodiments of the SMA components described herein may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA material may include a nickel-aluminum based alloys, copper-aluminum-nickel alloy, or alloys containing zinc, zirconium, copper, gold, platinum, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5 degrees C. and 150 degrees C. are used. NiTi alloys may change from austenite to martensite upon cooling.

Moreover, SMA materials may also display superelastic properties. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

The term "bimetallic material" refers to a material having a first layer formed of a first material and a second layer formed of a second material, with the first and second materials configured to expand differently in response to temperature, strain, or a combination thereof. For example, the first material may define a first coefficient of thermal expansion and the second material may define a second coefficient of thermal expansion different than the first coefficient of thermal expansion. Additionally or alternatively one of the first material or the second material may be a SMA material configured to expand differently than the other of the first material or the second material in response to operating conditions to which the bimetallic material is expected to be exposed.

The present disclosure is generally related to a seal member support system for a turbomachine of a gas turbine engine. A turbomachine generally includes a compressor section including a low-pressure compressor and a high-pressure compressor, a combustion section, and a turbine section including a high-pressure turbine and a low-pressure turbine arranged in serial-flow order. Each of the low-pressure compressor, the high-pressure compressor, the high-pressure turbine and the low-pressure turbine include sequential rows of stationary or stator vanes axially spaced by sequential rows of rotor blades. The rotor blades are generally coupled to a rotor shaft and the stator vanes are mounted circumferentially in a ring configuration about an outer surface of the rotor shaft. Radial gaps are formed between the outer surface of the rotor shaft and an inner portion of each ring or row of stator vanes.

During operation, it is desirable to control (reduce or prevent) compressed air flow or combustion gas flow leakage through these radial gaps. Ring seals are used to form a film bearing seal to seal these radial gaps. Ring seals generally include a plurality of seal shoe or seal member segments. As pressure builds in the compressor section and/or the turbine section, the seal members are forced radially outwardly and form a bearing seal between the outer surface of the rotor shaft and the respective seal members. To reduce wear on the rotor shaft and/or the seal members, it is desirable to maintain a positive radial clearance between the seal members and the outer surface of the rotor shaft under all operating conditions of the turbomachine. However, at low delta pressure operating conditions and transients like during start-up, stall, rotor vibration events, or during sudden pressure surges within the turbomachine, the film bearing stiffness may be low or suddenly change thus leading to seal member/rotor rubs.

A seal support assembly may be provided that allows for the seal to move along the radial direction at various engine operating condition to accommodate, e.g., vibration events at low delta pressure operating conditions and further to establish relatively tight clearances with the rotor during high delta pressure operating conditions.

Disclosed herein is a turbine engine defining an axial direction. The turbine engine includes: a rotor; a stator comprising a carrier; a seal support assembly coupled to the carrier; and a seal assembly disposed between the rotor and the stator and supported by the seal support assembly. The seal assembly defines a high pressure side and a low pressure side and includes a plurality of seal segments. The plurality of seal segments includes a first seal segment, the first seal segment having a seal face configured to form a fluid bearing with the rotor. The first seal segment further includes a lip assembly and a body. The lip assembly is positioned on the high pressure side and includes a seal lip having a high pressure surface defining a first angle with the axial direction and a low pressure surface defining a second angle with the axial direction, the second angle being greater than the first angle. The configuration of the lip assembly having the seal lip may allow for the lip assembly to accommodate radial movement of the first seal segment during various operations of the turbine engine, while maintaining a relatively tight clearance with the rotor to function as an airflow seal with the rotor.

Figure 1:
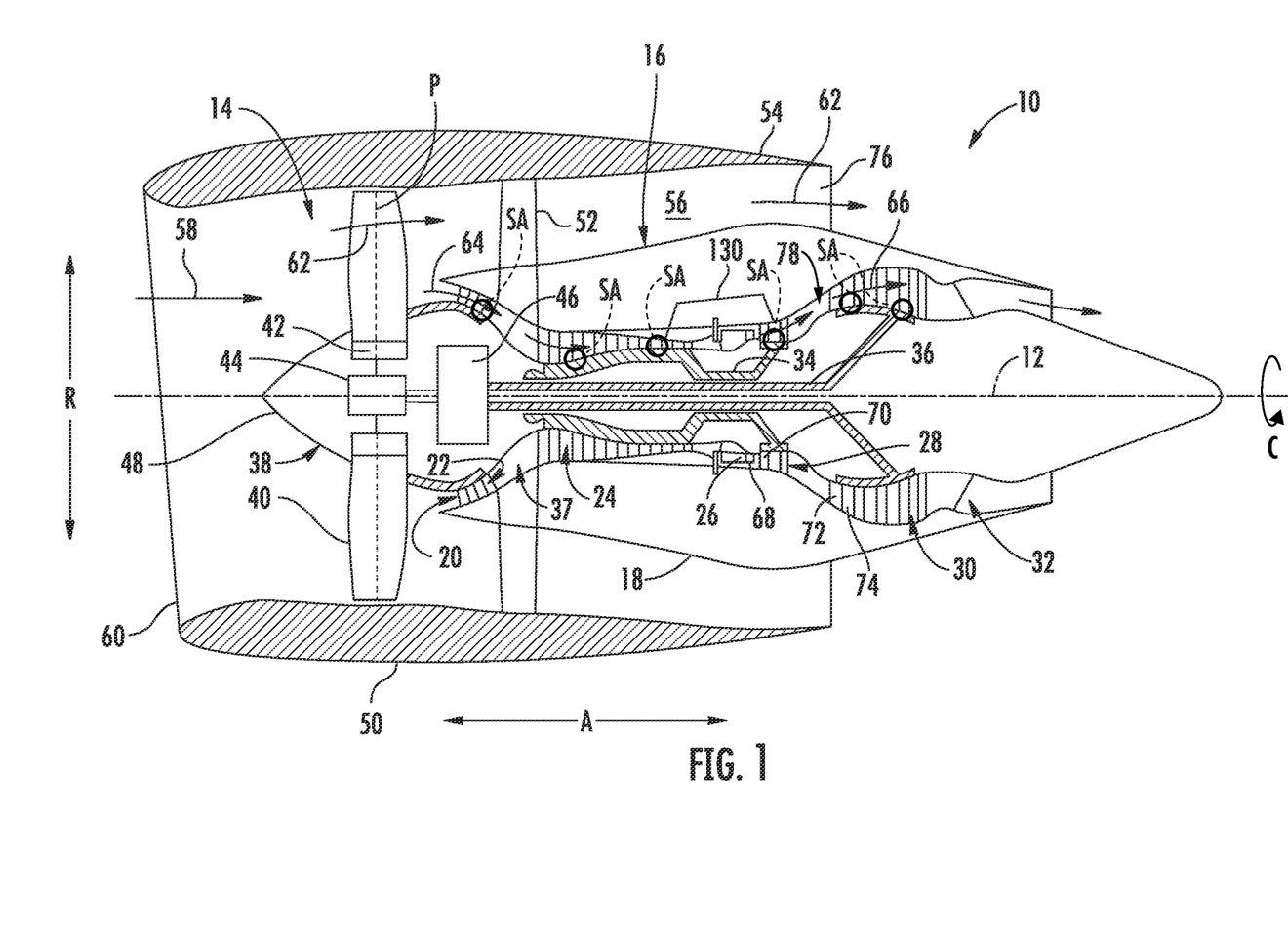
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R. and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and a jet exhaust nozzle section 32. A high-pressure (HP) shaft 34 (which may additionally or alternatively be a spool) drivingly connects the HP turbine 28 to the HP compressor 24. A low-pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from, e.g., the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
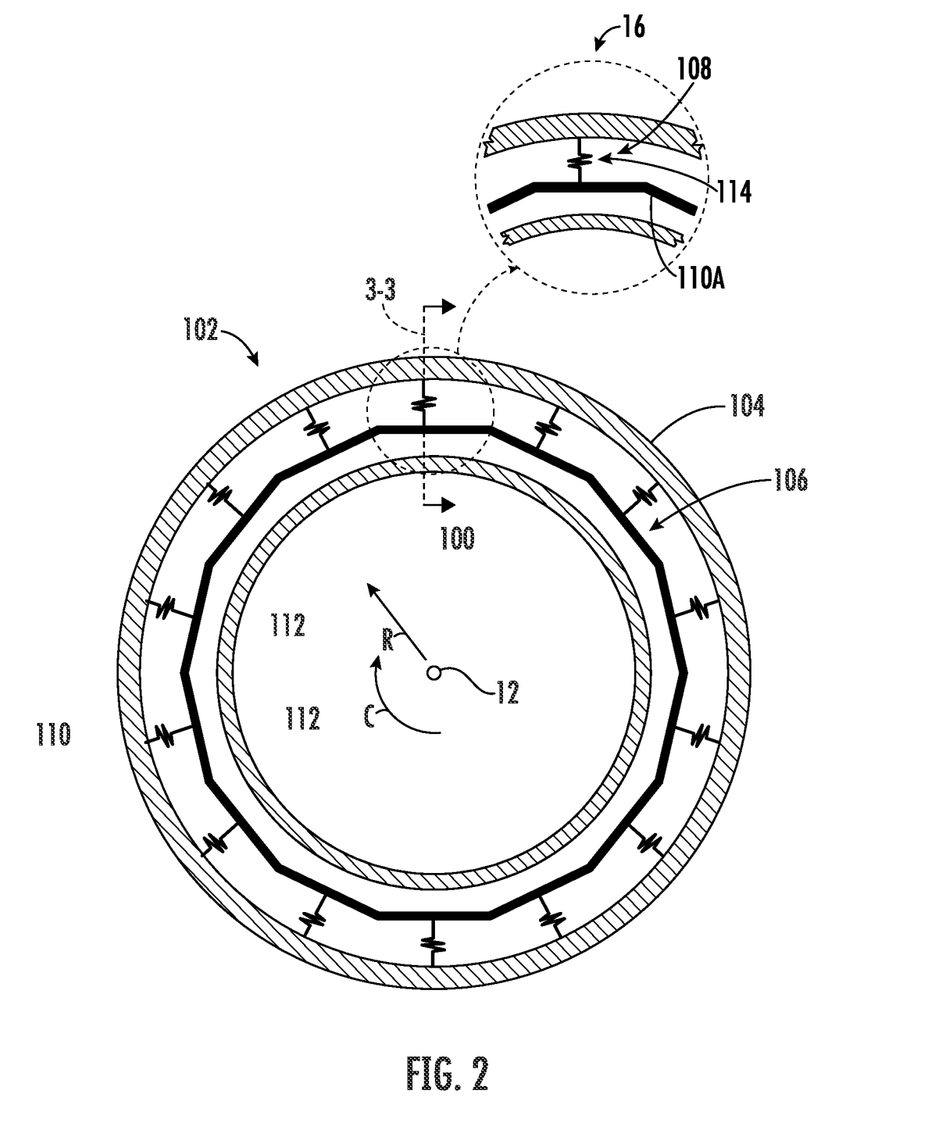
FIG. 2 is a cross sectional, schematic view of a portion of the turbomachine of FIG. 1.

Referring now to FIG. 2, a cross sectional, schematic view of a portion of the turbomachine 16 of FIG. 1 is provided. As will be appreciated, the exemplary turbomachine 16 generally includes a rotor 100, a stator 102 having a carrier 104, a seal assembly 106 disposed between the rotor 100 and the stator 102, and a seal support assembly 108. The rotor 100 may be any rotor of the turbomachine 16, such as the LP shaft 36, the HP shaft 34, etc. By way of example, referring briefly back to FIG. 1, Circles SA have been added to FIG. 1 to provide example locations that the seal assembly 106 and seal support assembly 108 of the present disclosure may be incorporated into a turbomachine of the present disclosure.

Referring still to FIG. 2, and as will be explained in more detail below, the exemplary seal assembly 106 includes a plurality of seal segments 110 arranged along the circumferential direction C. Each seal segment 110 of the plurality of seal segments 110 has a seal face 112 configured to form a fluid bearing with the rotor 100, and more specifically a radial fluid bearing (i.e., configured to constrain the rotor 100 along the radial direction R).

The seal support assembly 108 includes a spring arrangement 114 extending between the carrier 104 and a first seal segment 110A of the plurality of seal segments 110 to support the plurality of seal segments 110 of the seal assembly 106. The seal support assembly 108 may further include similar spring arrangements 114 extending between the carrier 104 and the other seal segments 110 of the plurality of seal segments 110.

Figure 3:
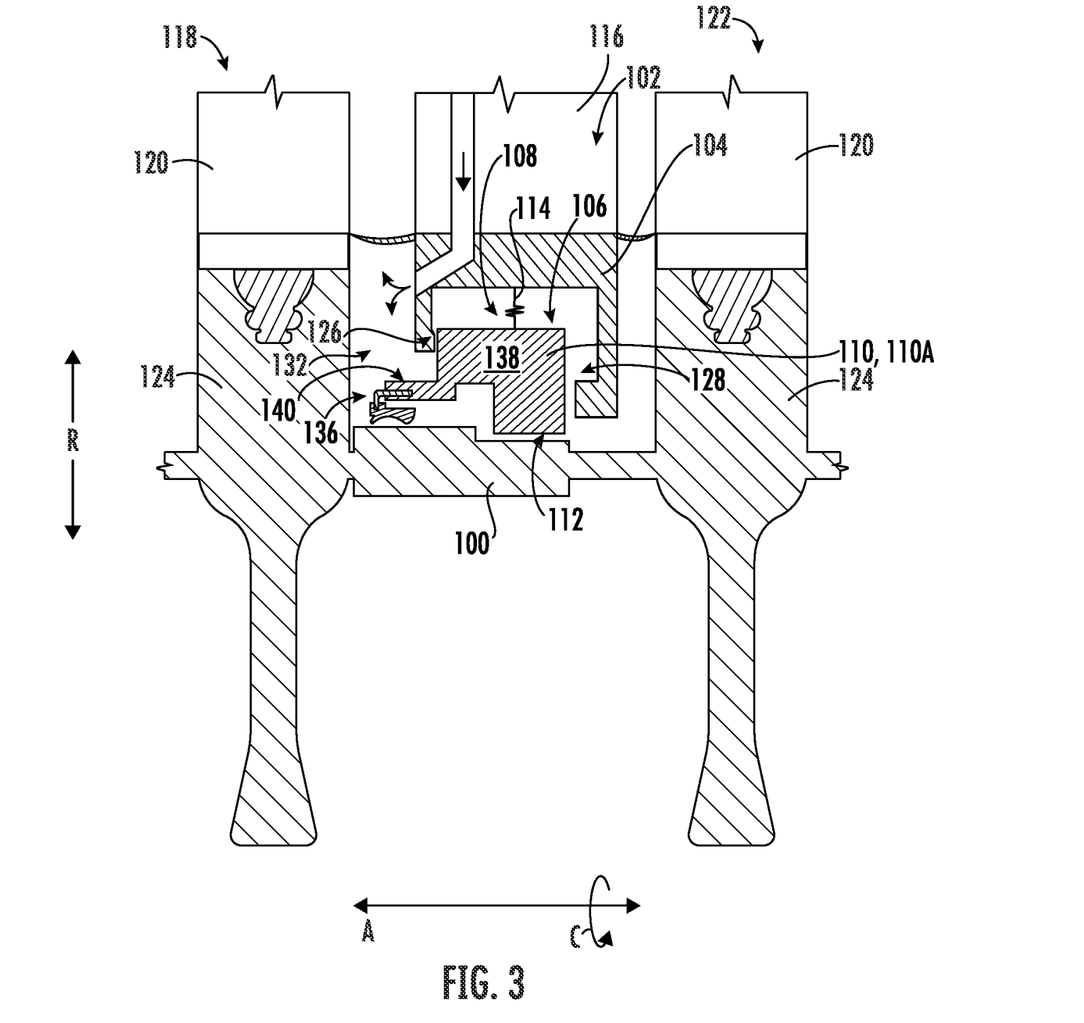
FIG. 3 is a close-up, schematic, cross-sectional view of a portion of the turbomachine of FIG. 2, taken along Line 3-3 and FIG. 2.

Further, referring now to FIG. 3, a close-up, schematic, cross-sectional view is depicted, taken along Line 3-3 and FIG. 2. In particular, FIG. 3 depicts the first seal segment 110A of the plurality of seal segments 110 positioned between the rotor 100 and the carrier 104 of the stator 102.

As will be appreciated, the stator 102 further includes a stator vane 116 and the seal assembly 106 is, in the embodiment depicted, positioned at an inner end of a stator vane 116 along the radial direction R of the turbomachine 16. The turbomachine 16 further includes a first stage 118 of rotor blades 120 and a second stage 122 of rotor blades 120 spaced along the axial direction A of the gas turbine engine 10. The seal assembly 106 is positioned between the first stage 118 of rotor blades 120 and the second stage 122 of rotor blades 120 along the axial direction A.

In the embodiment depicted, the seal assembly 106 is positioned within a turbine section of the gas turbine engine 10, such as within the HP turbine 28 or the LP turbine 30. In such a manner, it will be appreciated that the rotor 100 may be a rotor coupled to the HP turbine 28, such as the HP shaft 34, or a rotor coupled to the LP turbine 30, such as the LP shaft 36. More specifically, still, in the embodiment affected, the rotor 100 is a connector extending between a disk 124 of the first stage 118 of rotor blades 120 and a disk 124 of the second stage of rotor blades 120.

It will further be appreciated that the seal assembly 106 defines a high-pressure side 126 and a low-pressure side 128. The seal assembly 106 is operable to prevent or minimize an airflow from the high-pressure side 126 to the low-pressure side 128 between the rotor 100 and the seal assembly 106. In particular, it will be appreciated that the first seal segment 110A depicted includes the seal face 112 configured to form a fluid bearing with the rotor 100 to support the rotor 100 along the radial direction R and prevent or minimize the airflow from the high-pressure side 126 to the low-pressure side 128 between the rotor 100 and the seal assembly 106.

As will be appreciated, the first seal segment 110A may be in fluid communication with a high-pressure air source to provide a high-pressure fluid flow to the seal face 112 to form the fluid bearing with the rotor 100. In at least certain exemplary aspects, the high-pressure air source may be the working gas flowpath 37 through the gas turbine engine 10 and the seal assembly 106, and more specifically the first seal segment 110A, may be in fluid communication with the high-pressure air source, e.g., at the high-pressure side 126 of the seal assembly 106.

In particular, for the embodiment depicted, referring back briefly also to FIG. 1, the gas turbine engine 10 further includes a high-pressure air duct 130 extending from the high-pressure air source and in fluid communication with scal assembly 106. As noted, the high-pressure air source is the working gas flowpath 37, and more specifically is a portion of the working gas flowpath defined by the HP compressor 24 of the compressor section (see FIG. 1). The high-pressure air duct 130 extends to and through the stator vane 116 and to a high-pressure cavity 132 defined at the high-pressure side 126 of the seal assembly 106 (e.g., between the stator 102 and the rotor 100). A high-pressure airflow from the high-pressure air duct 130 may pressurize the high-pressure cavity 132 to prevent gasses from the working gas flowpath 37 (which may be combustion gasses) from entering the high-pressure cavity 132 and damaging one or more components exposed thereto. The high-pressure airflow may also feed the seal assembly 106. For example, although not depicted, it will be appreciated that the exemplary first seal segment 110A may define a plurality of air ducts extending therethrough, extending between one or more inlets in airflow communication with the high-pressure cavity 132 and one or more outlets in airflow communication with the seal face 112 to provide a necessary high-pressure airflow to form the fluid bearing with the rotor 100.

It will be appreciated, however, that in other exemplary embodiments, the seal assembly 106 may be integrated into, e.g., a compressor section of the gas turbine engine 10. In such a case, the high-pressure side 126 may be positioned on a downstream side or aft side of seal assembly 106, and the low-pressure side 128 may be positioned on an upstream side forward side of the seal assembly 106.

Figure 4:
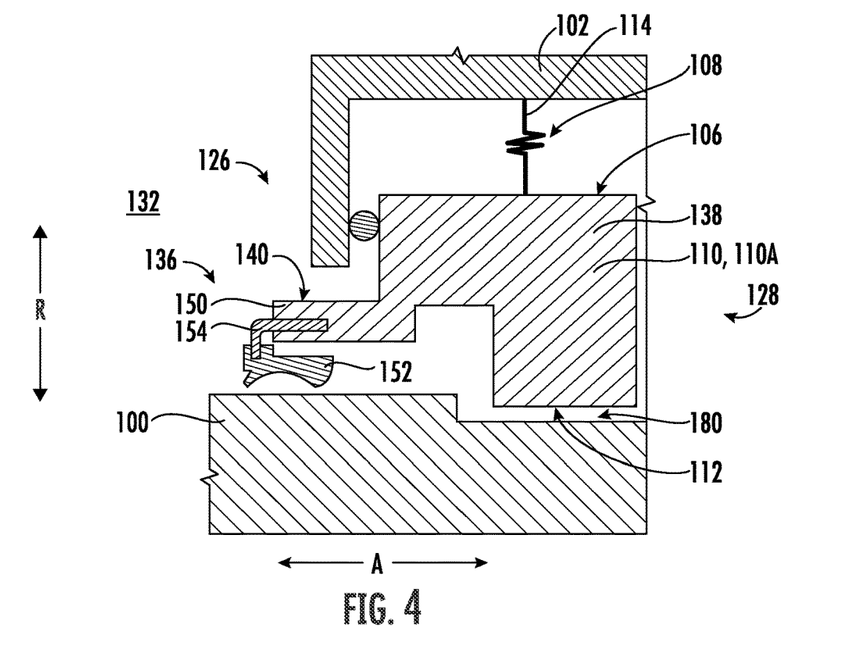
FIG. 4 is a close-up, schematic, cross-sectional view of the rotor, carrier, first seal segment, and seal support assembly of FIG. 3.

Referring now also to FIG. 4, a close-up, schematic, cross-sectional view is provided of the rotor 100, carrier 104, first seal segment 110A, and seal support assembly 108 of FIG. 3. As will be appreciated, the exemplary first seal segment 110A depicted further includes a lip assembly 136 and a body 138. The lip assembly 136 extends from the body 138 along the axial direction A of the gas turbine engine 10 on the high-pressure side 126 of the seal assembly 106. The lip assembly 136 includes an outer pressurization surface 140 along the radial direction R of the gas turbine engine 10. For the embodiment depicted, the outer pressurization surface 140 is in airflow communication with the working gas flowpath 37 of the gas turbine engine 10, and more specifically is exposed to the high-pressure cavity 132 and thus is in fluid communication with the working gas flowpath 37 of the gas turbine engine 10 from the high-pressure side 126 of the seal assembly 106. The outer pressurization surface 140 is a radially outer surface of the lip assembly 136, and as will be appreciated, as a pressure within the high-pressure cavity 132 increases, a radially-inward force exerted on the outer pressurization surface 140 (and the first seal segment 110A) correspondingly increases.

The seal support assembly 108, more specifically, the spring arrangement 114 of the seal support assembly 108, extends between the carrier 104 and the first seal segment 110A to counter a pressure on the outer pressurization surface 140 during operation of the gas turbine engine 10, while allowing for passive control of a radial clearance gap defined between the seal face 112 and the rotor 100 during operation of the turbine engine.

For example, the seal support assembly 108 may generally define a resistance along the radial direction R of the gas turbine engine 10. The gas turbine engine 10 may define a first high-pressure at the high-pressure side 126 of the seal assembly 106 (i.e., within the high-pressure cavity 132) when the gas turbine engine 10 is operated in the high power operating mode, and may further define the second high-pressure at the high-pressure side 126 of the seal assembly 106 (i.e., within the high-pressure cavity 132) when the gas turbine engine 10 is operated in the low power operating mode. The seal support assembly 108 is configured to hold the first seal segment 110A at a radial distance away from the rotor 100 when the gas turbine engine 10 defines the second high-pressure. By contrast, the seal support assembly 108 is configured to move the first seal segment 110A (or rather, allow the first seal segment 110A to move) towards the rotor 100 when the gas turbine engine 10 defines the first high-pressure. In such a manner, the seal support assembly 108 may allow for the first seal segment 110A to be moved closer to the rotor 100 during the high-pressure operating mode as compared to during the low-pressure operating mode.

Such a configuration may allow for a higher radial clearance between the first seal segment 110A and the rotor 100 during low-pressure operating conditions and transients, which may allow for accommodation of, e.g., rotor vibrations with a reduced amount of rub between the rotor 100 and the first seal segment 110A. Such a configuration may also allow for a lower radial clearance between the first seal segment 110A and the rotor 100 during high-pressure operating conditions when, e.g., rotor 100 vibrations may be less severe. As will be appreciated, the first seal segment 110A may be more effective at preventing or minimizing airflow from the high-pressure side 126 to the low-pressure side 128 with a lower radial clearance.

Figure 5:
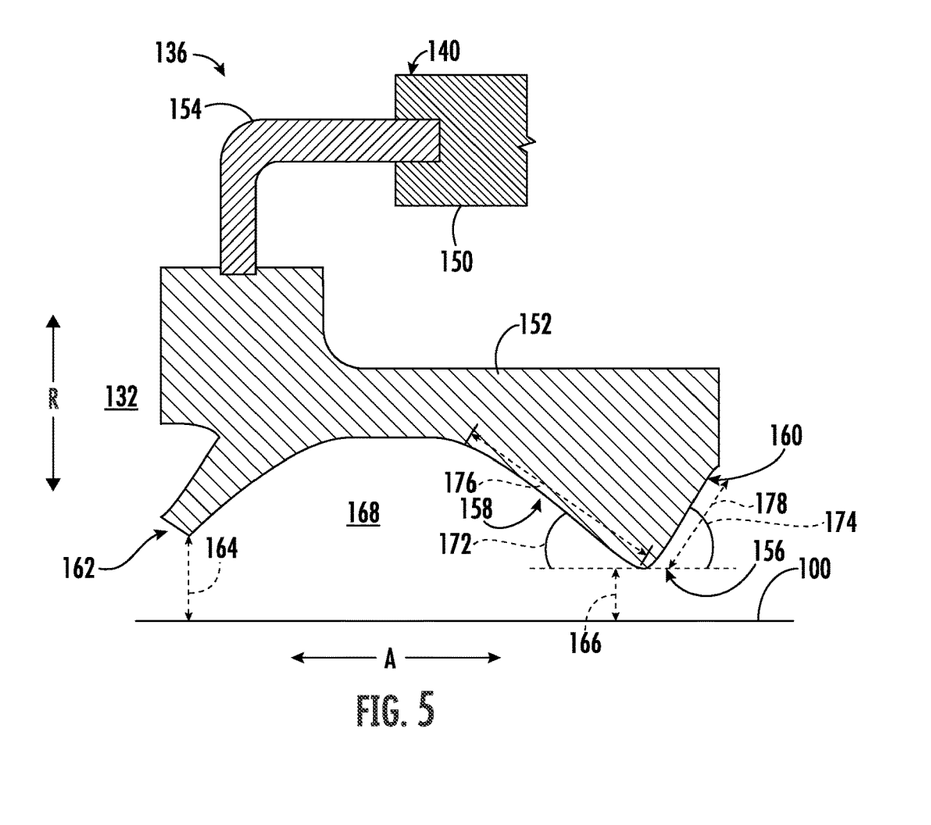
FIG. 5 is a close-up view of a lip seal assembly of the assembly of FIG. 4.

Referring still to FIG. 4, and now also to FIG. 5, a close-up view of the lip assembly 136 of the first seal segment 110A is provided. The seal assembly 106 generally includes a main lip body 150, a seal body 152, and a connector 154 extending between the seal body 152 and the main lip body 150.

The main lip body 150 is coupled to, or formed integrally with, the body 138 (see FIG. 4) of the first seal segment 110A. The main lip body 150 defines the outer pressurization surface 140 in the exemplary embodiment depicted.

As noted above, the seal body 152 is coupled to the main lip body 150 through the connector 154. For the embodiment shown, the connector 154 includes a section extending along the radial direction R of the turbine engine. The seal body 152 extends from the connector 154 in a direction towards the low-pressure side 128 of the seal assembly 106. In such a manner, it will be appreciated that the seal body 152 of the lip assembly 136 is cantilevered from the main lip body 150 and body 138 of the first seal segment 110A.

Referring particularly to FIG. 5, the seal body 152 includes a seal lip 156. The seal lip 156 includes a high-pressure surface 158 and a low-pressure surface 160. The high-pressure surface 158 is located closer to the high-pressure cavity 132 than the low-pressure surface 160.

Briefly, it will be appreciated that the seal body 152 of the lip assembly 136 further includes a dust lip 162 located forward of the seal lip 156, and more specifically, located upstream of the seal lip 156 in the embodiment shown. The dust lip 162 defines a first gap 164 with the rotor 100 and the seal lip 156 defines a second gap 166 with the rotor 100. The first gap 164 is larger than the second gap 166 during an operating condition of the turbine engine. In such a manner, an airflow from the high-pressure cavity 132 may flow into a seal body cavity 168 defined between the seal body 152 and the rotor 100 during operation of the gas turbine engine.

Further, it will be appreciated that the second gap 166 of the seal lip 156 defined with the rotor 100 may be relatively small so as to prevent at least a portion of the airflow from the high-pressure cavity 132 (and seal body cavity 168) from passing between the seal lip 156 and the rotor 100 during operation. In such manner, it will be appreciated that the seal lip 156, and more specifically, the first seal segment 110A defines a low-pressure cavity 170 opposite the seal lip 156 from the high-pressure cavity 132.

Further, still, it will be appreciated that the seal assembly 106 is designed to deflect along the radial direction R in response to an increase in a pressure differential between the high-pressure cavity 132 and the low-pressure cavity 170. Such may generally prevent a rubbing between the seal lip 156 and the rotor 100 during such an operating condition.

More specifically, it will be appreciated that the high-pressure surface 158 of the seal lip 156 defines a first angle 172 with the axial direction A and the low-pressure surface 160 defines a second angle 174 with the axial direction A. The second angle 174 is greater than the first angle 172. Both the first angle 172 and the second angle 174 are greater than 0 degrees and less than 90 degrees.

Notably, the radial direction R and the axial direction A together define a reference plane (the view depicted in FIG. 5), and the first angle 172 and the second angle 174 are each defined within the reference plane.

Due at least in part to the differences in a magnitude of the first angle 172 and the second angle 174, the high-pressure surface 158 defines a high-pressure surface length 176 and the low-pressure surface 160 defines a low-pressure surface length 178. The high-pressure surface length 176 and the low-pressure surface length 178 are each defined within the reference plane.

The smaller size of the first angle 172 relative to the second angle 174 and the larger size of the high-pressure surface length 176 relative to the low-pressure surface length 178 may together facilitate a deflection of the seal body 152, and more specifically of the seal lip 156, inwardly along the radial direction R in response to an increase in pressure of the high-pressure cavity 132 (and seal body cavity 168) relative to the low-pressure cavity 170. For example, as will be appreciated, the above configuration provides for an increased amount of surface area on the high-pressure surface 158 relative to the low-pressure surface 160, which may allow for a pressure of an air within the seal body cavity 168 defined between the high-pressure surface 158 and the rotor 100 to generate a larger amount of outward force along the radial direction R.

Furthermore, the inclusion of the dust lip 162 located upstream of the seal lip 156 may further allow for the seal body cavity 168 defined between the high-pressure surface 158 and the rotor 100 to maintain a pressure therein, which may further allow for the seal body 152 to form a fluid bearing with the rotor 100 located inward of the high-pressure surface 158 of the seal body 152 of the lip assembly 136. In the embodiment depicted, the rotor 100 defines a cylindrical shape at such location.

Moreover, referring particularly to FIG. 4, it will be appreciated that the second gap 166 defined between the seal lip 156 and the rotor 100 along the radial direction R is less than a gap 180 defined between the seal face 112 of the first seal segment 110A and the rotor 100 along the radial direction R. In such manner, in the event of a rotor deflection, the seal lip 156 may still contact the rotor 100 prior to the seal face 112 of the first seal segment 110A, despite the above-mentioned deflection of the seal body 152. Although a contact is not desired, such a configuration may allow for single point of contact with the rotor 100 and may further prevent a contact between the seal face 112 and the rotor 100, which may cause damage to the seal face 112.

In certain exemplary embodiments, the connector 154, the main lip body 150, and the seal body 152 may be coupled to one another in any suitable manner. For example, referring briefly to FIGS. 6 and 7, two exemplary embodiments of the present disclosure are provided. The exemplary embodiments of FIGS. 6 and 7 may be configured in similar manner as the exemplary embodiment described above with reference FIGS. 4 and 5.

Figure 6:
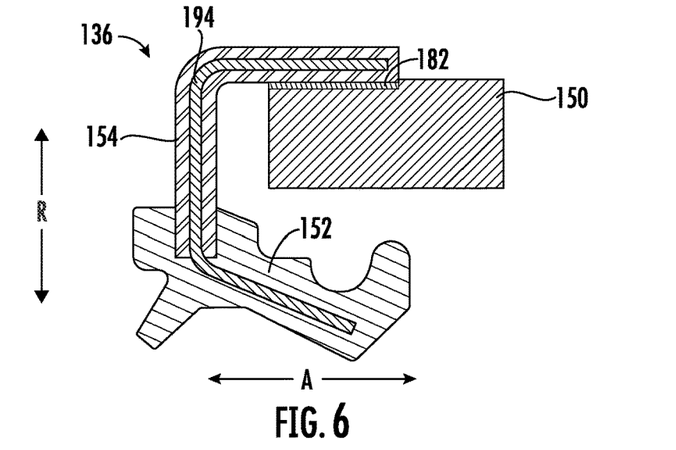
FIG. 6 is a close-up, schematic, cross-sectional view of a lip seal assembly in accordance with another embodiment of the present disclosure.

Referring particularly to FIG. 6, in the embodiment depicted, a connector 154 of a lip assembly 136 of the embodiment shown is depicted coupled to a main lip body 150 of the lip assembly 136 by brazing or welding, the brazing or welding joint indicated at 182. Such a configuration may provide for a relatively strong connection between these components.

Figure 7:
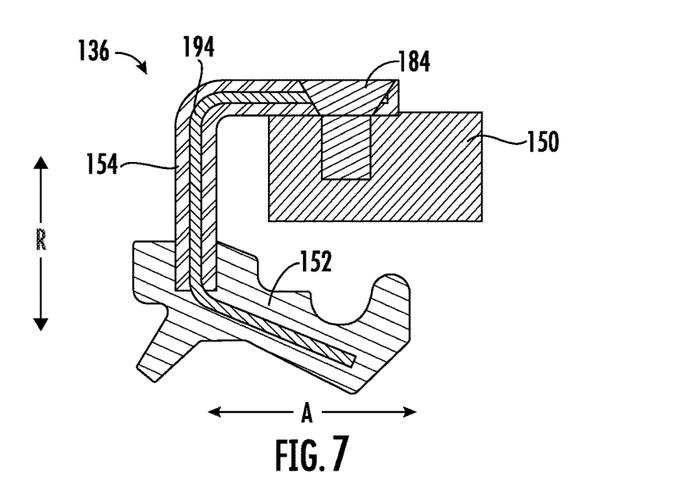
FIG. 7 is a close-up, schematic, cross-sectional view of a lip seal assembly in accordance with yet another embodiment of the present disclosure.

Referring particularly to FIG. 7, in the embodiment depicted, a connector 154 of a lip assembly 136 of the embodiment shown is depicted coupled to a main lip body 150 of the lip assembly 136 using a mechanical fastener 184, such as a screw, bolt, or the like. Such a configuration may provide for an assembly that may be removed for maintenance and/or repair operations.

Notably, referring back briefly to FIGS. 4 and 5, in order to provide the lip assembly 136 with a desired amount of resistance along the radial direction R, the connector 154 of the lip assembly 136 may be designed to provide a certain amount of stiffness. In at least certain exemplary embodiments, the connector 154, the main lip body 150, and the seal body 152 may be formed of a common material, such as the same metal material.

However, in other exemplary embodiments, the connector 154 may be formed of a material unique from a material of the seal body 152, the main lip body 150, or both. For example, in one exemplary embodiment, the connector 154 may be formed of a shape memory alloy material. The shape memory alloy material may be a temperature dependent shape memory alloy, or a strain-dependent shape memory alloy. In such a manner, a shape and/or stiffness of the connector 154 may change in response to an operating condition of the gas turbine engine.

Further, still, and other exemplary embodiments, the connector 154 may be formed of a bimetallic material.

Moreover, in still other exemplary embodiments, the lip assembly 136 may include other suitable structure to provide the desired amount of resistance along the radial direction R.

Figure 8:
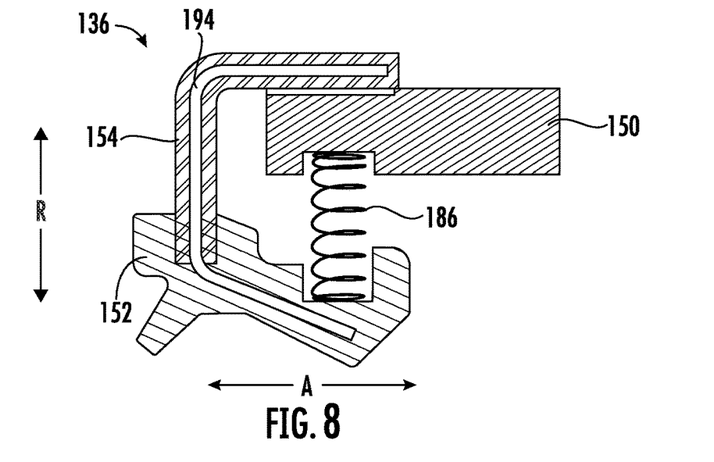
FIG. 8 is a close-up, schematic, cross-sectional view of a lip seal assembly in accordance with still another embodiment of the present disclosure.

For example, referring briefly to FIG. 8, an embodiment of the present disclosure is provided, which may be configured in a similar manner as one or more of the exemplary embodiments described hereinabove. In the embodiment depicted, a lip assembly 136 includes a radial spring member 186 operable with a seal body 152 of the lip assembly 136 to bias a seal lip 156 of the seal body 152 inwardly along a radial direction R of the turbine engine. In particular, for the embodiment shown, the radial spring member 186 is a helical spring extending between a main lip body 150 of the lip assembly 136 and the seal body 152.

Additionally, or alternatively, referring now briefly FIG. 9, another embodiment of the present disclosure is provided, which again may be configured in a similar manner as one or more of the exemplary embodiments described hereinabove. The embodiment depicted in FIG. 9 includes a lip assembly 136 having a garter spring 188 positioned outward of a seal body 152 of the lip assembly 136 to bias a seal lip 156 of the seal body 152 inwardly along a radial direction R of the turbine engine.

One or more of these exemplary embodiments may be utilized to provide a lip assembly 136 having a desired amount of stiffness along the radial direction R during operation of the turbine engine.

In at least certain embodiments, the configuration of the lip assembly 136 may be selected to define a stiffness that is less than a stiffness of the fluid bearing formed between a seal face 112 of the first seal segment 110 and the rotor 100 of the turbine engine. In such a manner, the lip assembly 136, and more specifically, the connector 154 and/or the seal body 152 of the lip assembly 136 may be configured to absorb stresses along the radial direction R, minimizing or reducing an amount of stress to be absorbed by the fluid bearing formed between the seal face 112 of the first seal segment 110A and the rotor 100 of the turbine engine.

As will be appreciated, a functionality of the seal body 152, and more specifically of the seal lip 156, to restrict an airflow from the high-pressure cavity 132 to low-pressure cavity 170 may be enabled at least in part by minimizing airflow leakage between adjacent lip assemblies 136 along a circumferential direction C of the turbine engine. For example, in only certain exemplary embodiments, wherein a plurality of seal segments are provided along the circumferential direction C of the gas turbine engine, with each seal segment including a respective lip assembly 136, it may be important to minimize a leakage of airflow from the high-pressure cavity 132 to the low-pressure cavity 170 between adjacent seal segments along the circumferential direction C.

Figure 9:
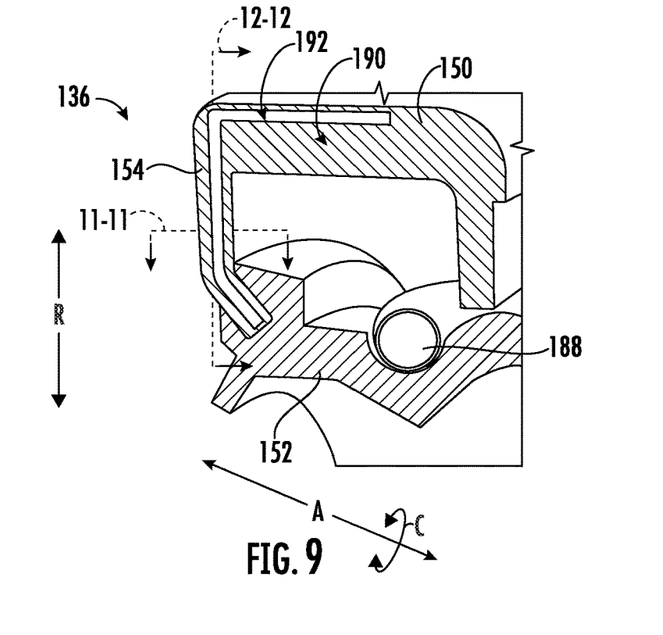
FIG. 9 is a close-up, schematic, cross-sectional view of a lip seal assembly in accordance with yet another embodiment of the present disclosure.
Figure 10:
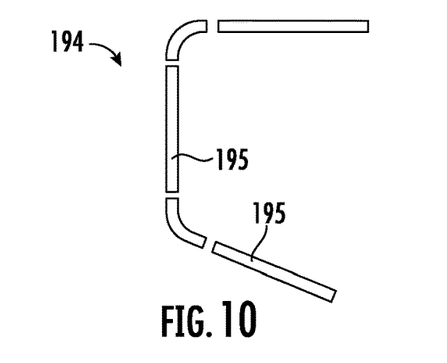
FIG. 10 is a schematic view of a spline in accordance with an embodiment of the present disclosure.

In order to reduce such a leakage, referring still to FIG. 9, it will be appreciated that the lip assembly 136 depicted defines a circumferential end 190, and further defines a portion of a spline seal groove 192 at the circumferential end 190. Referring to FIG. 10, an example spline 194 is depicted that may be received within the portion of the spline seal groove 192 defined by the lip assembly 136 of FIG. 9. As will be appreciated, the spline 194 of FIG. 10 is a multi-piece spline, formed of a plurality of individual spline segments 195. Such may allow for relatively easy installation.

However, in other embodiments, the spline 194 may be a single-piece spline, extending continuously along its length. Such may provide for better airflow sealing capabilities. The exemplary splines 194 depicted in FIGS. 6 through 8 are single-piece splines.

Figure 11:
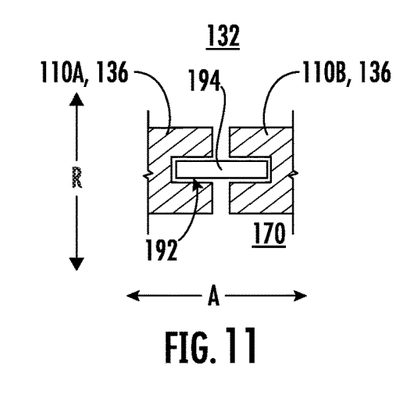
FIG. 11 is a schematic view of a spline between adjacent seal segments in a view similar to the view indicated by Line 11-11 of FIG. 9.
Figure 12:
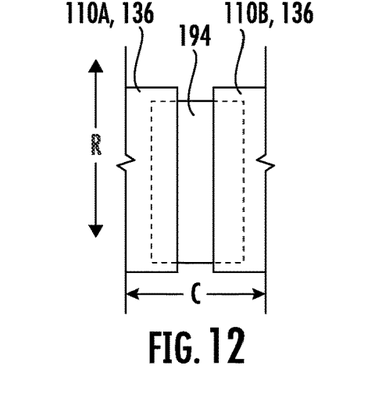
FIG. 12 is a schematic view of a spline between adjacent seal segments in a view similar to the view indicated by Line 12-12 of FIG. 9.

Referring now to FIG. 11, a schematic view is depicted of a first lip assembly 136 of the first seal segment 110A and a second lip assembly 136 of a second seal segment 110B in a view similar to the view indicated by Line 11-11 of FIG. 9. Referring also to FIG. 12, a schematic view is depicted of the first lip assembly 136 of the first seal segment 110A and the second lip assembly 136 of the second seal segment of FIG. 11, in a view similar to the view indicated by Line 12-12 FIG. 9.

As will be appreciated, the first seal segment 110A is positioned adjacent to the second seal segment 110B in the circumferential direction C, more specifically, the lip assembly 136 of the first seal segment 110A is positioned adjacent to the lip assembly 136 of the second seal segment 110B in the circumferential direction C. A circumferential end of the lip assembly 136 of the first seal segment 110A and a circumferential end of the lip assembly 136 of the second seal segment 110B together define the spline seal groove 192. The spline 194 is positioned within the spline seal groove 192 to prevent or minimize leakage from a high-pressure cavity 132 to a low-pressure cavity 170 (see FIG. 11) between adjacent lip assemblies 136 of adjacent seal segments 110A, 110B. Such a configuration may facilitate certain operations of the lip assembly 136, such as one or more of the operations described hereinabove.

Figure 13:
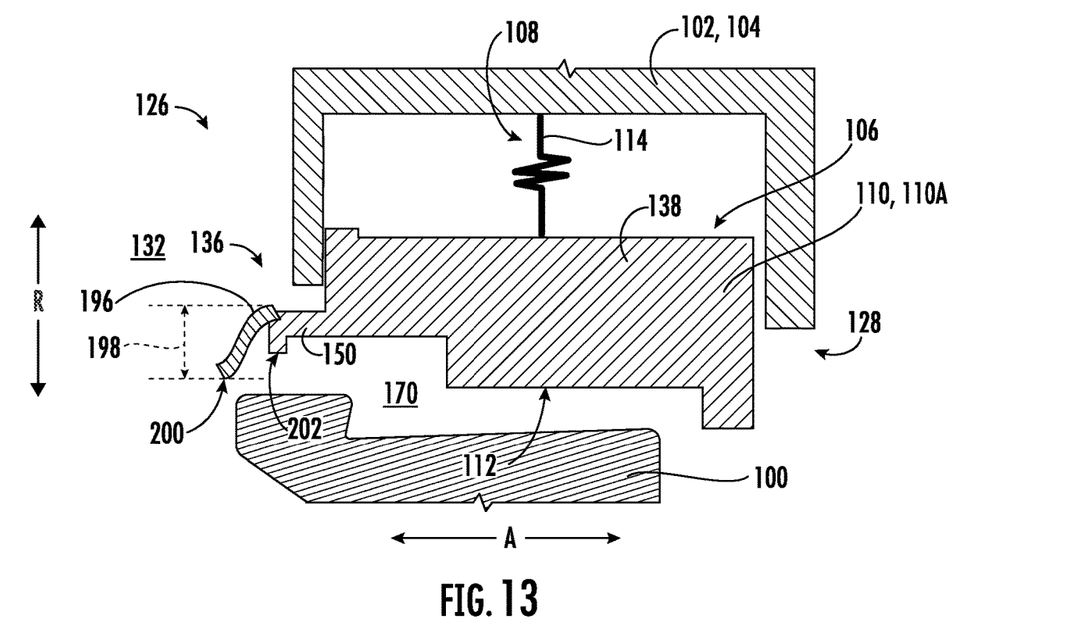
FIG. 13 is a close-up, schematic, cross-sectional view of a rotor, a stator having a carrier, a seal assembly, and a seal support assembly in accordance with another embodiment of the present disclosure.
Figure 14:
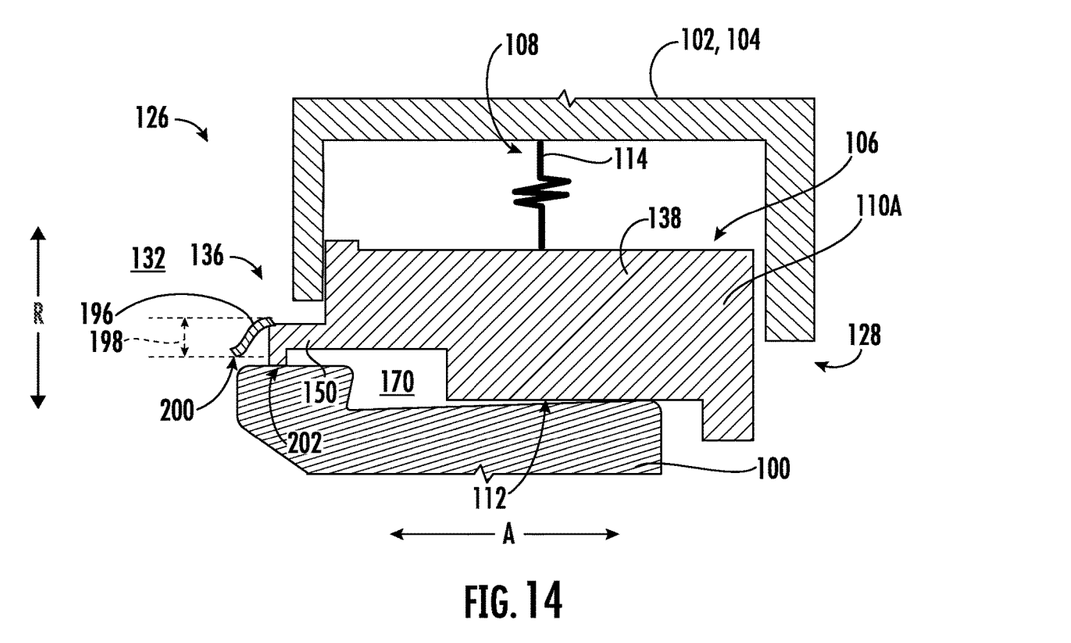
FIG. 14 is a close-up, schematic, cross-sectional view of the embodiment of FIG. 13 in a second position.

It will be appreciated, however, that in still other exemplary embodiments, a seal assembly 106 for a turbine engine may be provided in accordance with another exemplary embodiment of the present disclosure. For example, referring now to FIGS. 13 and 14, a section of a turbine engine is provided in accordance with another embodiment. The exemplary embodiment of FIGS. 13 and 14 may be configured in a similar manner as one or more of the exemplary embodiments described hereinabove. FIG. 13 depicts the assembly when the turbine engine is in a first operating condition, such as a low power operating condition; and FIG. 14 depicts the assembly when the turbine engine is in a second operating condition, such as a high power operating condition.

For example, the exemplary embodiment includes a rotor 100, a stator 102 having a carrier 104, a seal support assembly 108 coupled to the carrier 104, and a seal assembly 106 positioned between the rotor 100 and the stator 102 and supported by the seal support assembly 108. As with the embodiments described above, the seal assembly 106 defines a high-pressure side 126 and a low-pressure side 128 and includes a first seal segment 110A. The first seal segment 110A may be one of a plurality of seal segments 110 of the seal assembly 106 (see, e.g., FIG. 2). The first seal segment 110A includes a seal face 112 configured to form a fluid bearing with the rotor 100, a body 138, and a lip assembly 136. The lip assembly 136 is fixedly coupled to the body 138 on the high-pressure side 126 of the seal assembly 106.

However, for the embodiment depicted, the lip assembly 136 includes a lip seal extension 196 and a main lip body 150, with the lip seal extension 196 extending from the main lip body 150. The lip seal extension 196 defines a height 198 along a radial direction R of the turbine engine. The lip seal extension 196 is formed of a material configured to change shape in a desired manner in response to anticipated operating conditions of the turbine engine. For example, the lip seal extension 196 defines a first shape when the turbine engine is operated in the first operating condition (FIG. 13) and a second shape turbine engines operated in the second operating condition (FIG. 14).

More specifically, for the embodiment depicted the lip seal extension 196 is formed of a shape memory alloy material, a bimetallic material, or both to reduce the height 198 of the lip seal extension 196 in response to an increase in a pressure to which it is exposure, an increase in a temperature to which it is exposure, or both.

More specifically, still, for the embodiment depicted, the lip seal extension 196 is formed of a shape memory alloy material and is configured to change from the shape depicted in FIG. 13 to the shape depicted in FIG. 14 in response to an increase in temperature of an airflow within a high-pressure cavity 132 at the high-pressure side 126 of the seal assembly 106, in response to an increase in a pressure of the airflow within the high-pressure cavity 132 at the high-pressure side 126 of the seal assembly 106, or both. In such a manner, it will be appreciated that the lip seal extension 196 may be formed of a temperature-dependent shape memory alloy material, or a strain-dependent shape memory alloy material, or both.

With such a configuration, the lip seal extension 196 may be configured to reduce a flow of air from the high-pressure cavity 132 to a low-pressure cavity 170 defined by the seal assembly 106 during, e.g., the low power operating condition of the turbine engine. However, as the turbine engine transitions to the high power operating condition of the turbine engine (during which a temperature and a pressure of an airflow with thin the high-pressure cavity 132 increases), the lip seal extension 196 is configured reduce its height 198 to allow the first seal segment 110A to move inwardly along the radial direction R.

Accordingly, an inner edge 200 of the lip seal extension 196 along the radial direction R is configured to move outwardly along the radial direction R during such a transition. Notably, it will be appreciated that the main lip body 150 includes an inner edge 202 along the radial direction R at the high-pressure side 126. The lip seal extension 196 is movable between the first position (FIG. 13) in which the inner edge 200 of the lip seal extension 196 is positioned inward of the inner edge 202 of the main lip body 150 along the radial direction R, and the second position (FIG. 14) in which the inner edge 200 of the lip seal extension 196 is positioned outward of the inner edge 202 of the main lip body 150 along the radial direction R.

In such a manner, it will be appreciated that the inner edge 202 of the main lip body 150 may function to reduce an airflow from the high-pressure cavity 132 to the low-pressure cavity 170 for the first seal segment 110A when the turbine engines operated in the high power condition.

Further aspects are provided by the subject matter of the following clauses:

A turbine engine defining an axial direction, comprising: a rotor; a stator comprising a carrier; a seal support assembly coupled to the carrier; and a seal assembly disposed between the rotor and the stator and supported by the seal support assembly, the seal assembly defining a high pressure side and a low pressure side and comprising a plurality of seal segments, the plurality of seal segments having a first seal segment, the first seal segment having a seal face configured to form a fluid bearing with the rotor, a lip assembly, and a body, the lip assembly positioned on the high pressure side, the lip assembly including a seal lip having a high pressure surface defining a first angle with the axial direction and a low pressure surface defining a second angle with the axial direction, the second angle being greater than the first angle.

The turbine engine of any preceding clause, wherein the lip assembly includes a dust lip located upstream of the seal lip, wherein the dust lip defines a first gap with the rotor, wherein the seal lip defines a second gap with the rotor, and wherein the first gap is larger than the second gap at an operating condition of the turbine engine.

The turbine engine of any preceding clause, wherein the lip assembly includes a seal body having the seal lip, and wherein the seal body is cantilevered from the body of the first seal segment.

The turbine engine of any preceding clause, wherein the lip assembly includes a connector extending along a radial direction of the turbine engine, and wherein the seal body extends from the connector in a direction towards the low pressure side.

The turbine engine of any preceding clause, wherein the turbine engine defines a radial direction and a reference plane defined by the axial direction and the radial direction, and wherein the low pressure surface defines a length in the reference plane less than a length of the high pressure surface in the reference plane.

The turbine engine of any preceding clause, wherein the turbine engine defines a radial direction and a reference plane defined by the axial direction and the radial direction, wherein the first angle and the second angle are each defined in the reference plane.

The turbine engine of any preceding clause, wherein the rotor defines a cylindrical surface inward of the low pressure surface and inward of the high pressure surface of the lip assembly.

The turbine engine of any preceding clause, wherein the lip assembly includes a connector formed of a shape memory alloy material.

The turbine engine of any preceding clause, wherein the lip assembly includes a seal body having the seal lip and a radial spring extension operable with the seal body to bias the seal lip inwardly along a radial direction of the turbine engine.

The turbine engine of any preceding clause, wherein the lip assembly further includes a main lip body and a connector extending between the main lip body and the seal body, and wherein the radial spring extension is a helical spring extending between the main lip body and the seal body.

The turbine engine of any preceding clause, wherein the lip assembly includes a garter spring positioned outward of the seal body to bias the seal lip inwardly along a radial direction of the turbine engine.

The turbine engine of any preceding clause, wherein the lip assembly is a first lip assembly, wherein the plurality of seal segments further includes a second seal segment positioned adjacent to the first seal segment, wherein the second seal segment comprises a second lip assembly, wherein the first and second lip assemblies together define a spline seal groove, and wherein the seal support assembly includes a spline seal positioned within the spline seal groove.

The turbine engine of any preceding clause, wherein the spline seal is formed of a shape memory alloy material.

The turbine engine of any preceding clause, wherein the lip assembly is coupled to the body by brazing, using mechanical fasteners, or both.

A seal assembly for a turbine engine, the turbine engine having a rotor, a carrier, and a seal support assembly coupled to the carrier, the seal assembly comprising: a first seal segment configured to be disposed between the rotor and the carrier and supported by the seal support assembly, the first seal segment defining a high pressure side and a low pressure side and comprising a seal face configured to form a fluid bearing with the rotor, the first seal segment further comprising a lip assembly and a body, the lip assembly positioned on the high pressure side, the lip assembly including a seal lip having a high pressure surface configured to define a first angle with an axial direction of the turbine engine and a low pressure surface configured to define a second angle with the axial direction, the second angle being greater than the first angle.

The seal assembly of any preceding clause, wherein the lip assembly includes a dust lip located upstream of the seal lip, wherein the dust lip is configured to define a first gap with the rotor, wherein the seal lip is configured to define a second gap with the rotor, and wherein the first gap is larger than the second gap at an operating condition of the turbine engine.

The seal assembly of any preceding clause, wherein the turbine engine defines a radial direction and a reference plane defined by the axial direction and the radial direction, and wherein the low pressure surface defines a length in the reference plane less than a length of the high pressure surface in the reference plane.

A turbine engine defining a radial direction, the turbine engine comprising: a rotor; a stator comprising a carrier; a seal support assembly coupled to the carrier; and a seal assembly disposed between the rotor and the stator and supported by the seal support assembly, the seal assembly defining a high pressure side and a low pressure side and comprising a plurality of seal segments, the plurality of seal segments having a first seal segment, the first seal segment having a seal face configured to form a fluid bearing with the rotor, a lip seal extension, and a body, the lip seal extension fixedly coupled to the body on the high pressure side and defining a height along the radial direction, the lip seal extension formed or a shape memory alloy material, a bimetallic material, or both to reduce the height in response to an increase in pressure exposure, an increase in temperature exposure, or both.

The turbine engine of any preceding clause, wherein the lip seal extension is formed of a shape memory alloy material.

The turbine engine of any preceding clause, wherein the body includes an inner edge along the radial direction at the high pressure side, wherein the lip seal extension is moveable between a first position in which an end of the lip seal extension is positioned inward of the inner edge along the radial direction and a second position in which the end of the lip seal extension is positioned outward of the inner edge along the radial direction.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine engine defining an axial direction, comprising:
    a rotor;
    a stator comprising a carrier;
    a seal support assembly coupled to the carrier; and
    a seal assembly disposed between the rotor and the stator and supported by the seal support assembly, the seal assembly defining a high pressure side and a low pressure side and comprising a plurality of seal segments, the plurality of seal segments including a first seal segment, the first seal segment having a seal face configured to form a fluid bearing with the rotor, a lip assembly, and a body, the lip assembly positioned on the high pressure side and defining an outer pressurization surface in a radially outward direction in fluid communication with the high pressure side, the lip assembly including a seal lip having a high pressure surface defining a first angle with the axial direction and a low pressure surface defining a second angle with the axial direction, wherein the second angle is greater than 0 degrees and less than 90 degrees, the second angle being greater than the first angle,
    wherein the lip assembly includes a seal body having the seal lip, and wherein the seal body is cantilevered from the body of the first seal segment.

2. The turbine engine of claim 1, wherein the lip assembly includes a dust lip located upstream of the seal lip, wherein the dust lip defines a first gap with the rotor, wherein the seal lip defines a second gap with the rotor, and wherein the first gap is larger than the second gap at an operating condition of the turbine engine.

3. The turbine engine of claim 1, wherein the lip assembly includes a connector extending along a radial direction of the turbine engine, and wherein the seal body extends from the connector in a direction towards the low pressure side.

4. The turbine engine of claim 1, wherein the turbine engine defines a radial direction and a reference plane defined by the axial direction and the radial direction, and wherein the low pressure surface defines a length in the reference plane less than a length of the high pressure surface in the reference plane.

5. The turbine engine of claim 1, wherein the turbine engine defines a radial direction and a reference plane defined by the axial direction and the radial direction, wherein the first angle and the second angle are each defined in the reference plane.

6. The turbine engine of claim 1, wherein the rotor defines a cylindrical surface inward of the low pressure surface and inward of the high pressure surface of the lip assembly.

7. The turbine engine of claim 1, wherein the lip assembly includes a connector formed of a shape memory alloy material.

8. The turbine engine of claim 1, wherein the lip assembly includes the seal body having the seal lip and a radial spring extension operable with the seal body to bias the seal lip inwardly along a radial direction of the turbine engine.

9. The turbine engine of claim 8, wherein the lip assembly further includes a main lip body and a connector extending between the main lip body and the seal body, and wherein the radial spring extension is a helical spring extending between the main lip body and the seal body.

10. The turbine engine of claim 8, wherein the lip assembly includes a garter spring positioned outward of the seal body to bias the seal lip inwardly along a radial direction of the turbine engine.

11. The turbine engine of claim 1, wherein the lip assembly is a first lip assembly, wherein the plurality of seal segments further includes a second seal segment positioned adjacent to the first seal segment, wherein the second seal segment comprises a second lip assembly, wherein the first and second lip assemblies together define a spline seal groove, and wherein the seal support assembly includes a spline seal positioned within the spline seal groove.

12. The turbine engine of claim 11, wherein the spline seal is formed of a shape memory alloy material.

13. The turbine engine of claim 1, wherein the lip assembly is coupled to the body by brazing, using mechanical fasteners, or both.

14. A seal assembly for a turbine engine, the turbine engine having a rotor, a carrier, and a seal support assembly coupled to the carrier, the seal assembly comprising:
 a first seal segment configured to be disposed between the rotor and the carrier and supported by the seal support assembly, the first seal segment defining a high pressure side and a low pressure side and comprising a seal face configured to form a fluid bearing with the rotor, the first seal segment further comprising a lip assembly and a body, the lip assembly positioned on the high pressure side and defining an outer pressurization surface in a radially outward direction in fluid communication with the high pressure side, the lip assembly including a seal lip having a high pressure surface configured to define a first angle with an axial direction of the turbine engine and a low pressure surface configured to define a second angle with the axial direction, wherein the second angle is greater than 0 degrees and less than 90 degrees, the second angle being greater than the first angle,
 wherein the lip assembly includes a seal body having the seal lip, and wherein the seal body is cantilevered from the body of the first seal segment.

15. The seal assembly of claim 14, wherein the lip assembly includes a dust lip located upstream of the seal lip, wherein the dust lip is configured to define a first gap with the rotor, wherein the seal lip is configured to define a second gap with the rotor, and wherein the first gap is larger than the second gap at an operating condition of the turbine engine.

16. The seal assembly of claim 14, wherein the turbine engine defines a radial direction and a reference plane defined by the axial direction and the radial direction, and wherein the low pressure surface defines a length in the reference plane less than a length of the high pressure surface in the reference plane.

* * * * *